June 11, 1968 T. J. FARRELL 3,388,196
DECORATIVE PLASTIC
Filed April 2, 1964 3 Sheets-Sheet 1
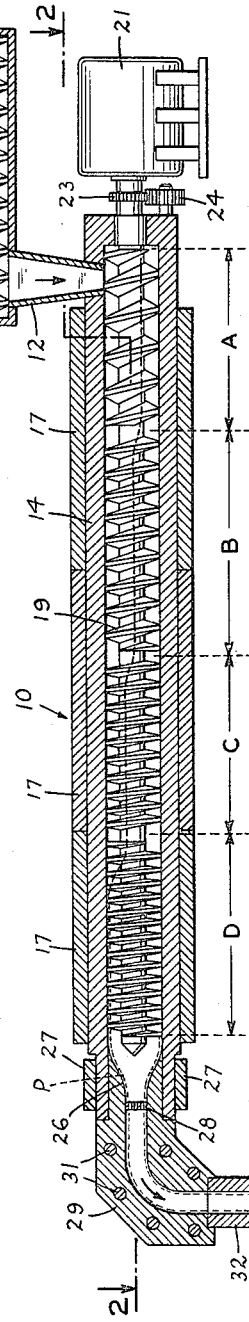
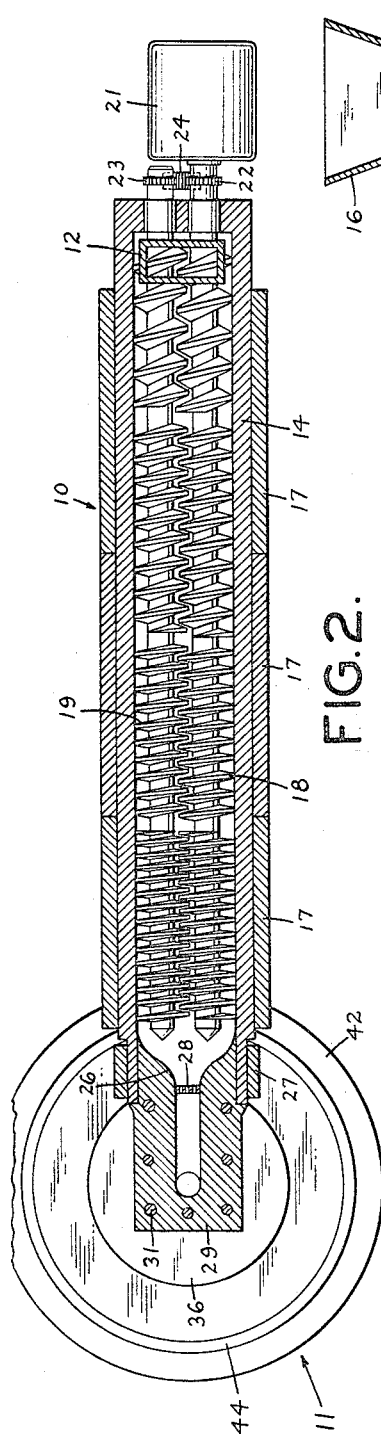
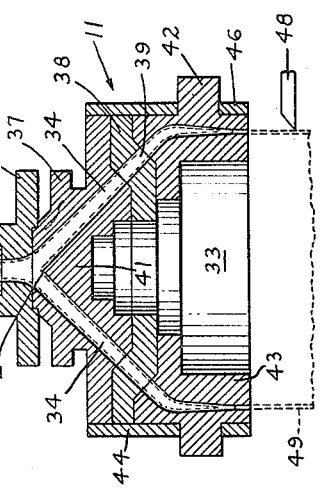
INVENTOR
THOMAS J. FARRELL
BY
Richard E. Vila
ATTORNEY 3,388,196
DECORATIVE PLASTIC
Thomas J. Farrell, Morris Plains, N.J., assignor to Allied Chemical Corporation, New York, N.Y., a corporation of New York
Filed Apr. 2, 1964, Ser. No. 356,810
7 Claims. (Cl. 264—75)

ABSTRACT OF THE DISCLOSURE

Rigid thermoplastic sheet products having random surface variegations resembling those of marble are produced by combining and extruding a mixture of thermoplastic resin components wherein the major components comprises at least 90% of the mixture under conditions wherein the minor component is dispersed throughout the major component in the form of separate and discrete entities.

---

This invention relates to decorative plastic material and more particularly to a method for the manufacture of rigid thermoplastic products having a marble-like appearance. It also particularly relates to new rigid thermoplastic sheet having random variegations simulating those of marble.

Marble, as it occurs naturally, is a premium substance having a very pleasing appearance. It would be of course very desirable to simulate the appearance of marble in products based on modern-day plastics but efforts to do so have resulted in products limited in scope of application and have generally involved complex procedures. The principal area in which results have been relatively successful has been in the manufacture of flexible, i.e., highly plasticized, plastic products such as floor covering, tiles and the like. For example, marble-like or variegated effects have been obtained in plastic materials suit able for flooring and the like by feeding of rods of different colors into the nip of calenders adapted to produce flexible sheeting. It has also been proposed to produce similar products by lamination of plastic sheets of various colors and sizes. Unfortunately, the manufacture of so-called rigid plastic materials containing little or no plasticizer but still having the appearance of marble is an entirely different matter. In this area extrusion is the more practical method and the prior art has failed to provide to my knowledge a satisfactory method for producing a rigid sheet having the random variegations of marble.

An object of the present invention is to provide decorative rigid plastic products. Another object is to provide rigid thermoplastic sheet products having random color variegations simulating the appearance of marble. Another object of the invention is to provide a method for producing marblized rigid plastic materials. Another object of the invention is to provide a method whereby rigid plastic materials having the appearance of true marble may be efficiently produced by extrusion. A further object of the invention is to provide a method for producing rigid plastic sheet having on one or both sides thereof the random color variegations which simulate the appearance of true marble. Other objects and advantages will be evident from the following description of the invention.

The present invention and apparatus for its practice will be evident from the following description and accompanying drawings in which:

FIG. 1 is a combination diagrammatic and sectional view in elevation illustrating the method of the invention and a preferred form of apparatus in which the invention may be carried out.

FIG. 2 is a sectional plan view taken generally along line 2—2 of FIG. 1 showing internal construction of extruder which apparatus can be employed in carrying out the invention.

Figure 3:
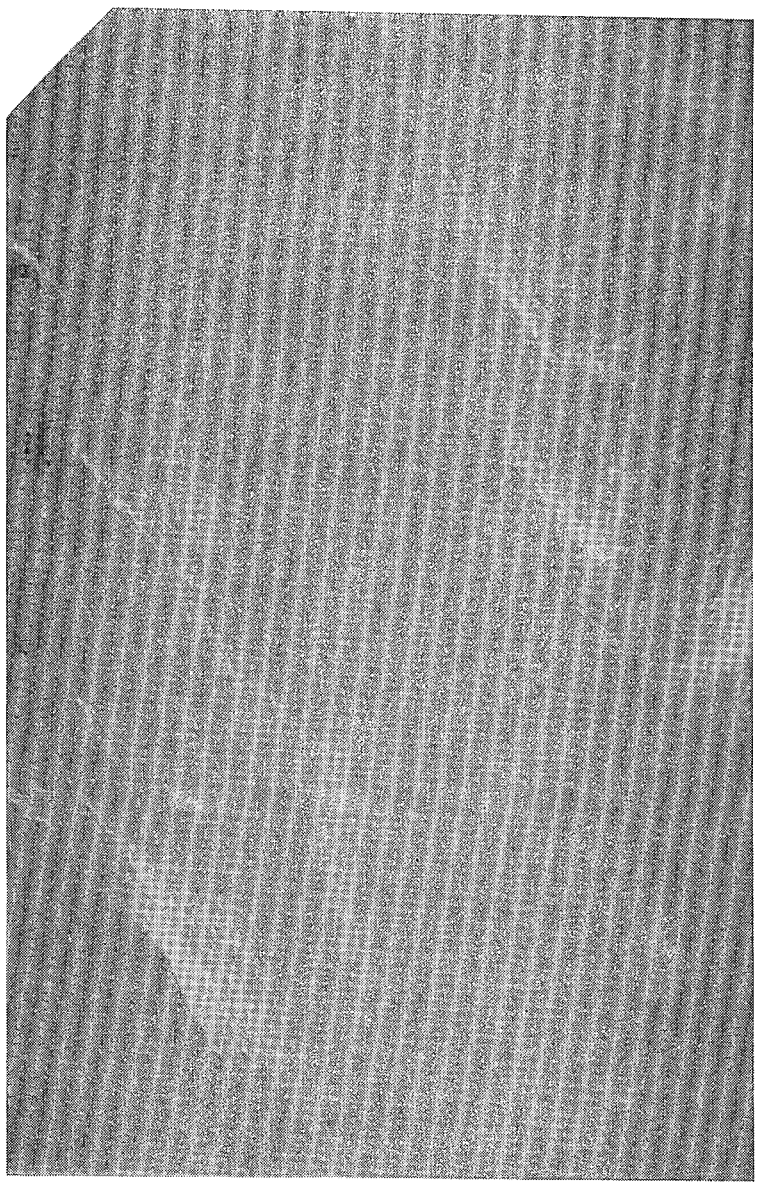
FIG. 3 shows one side of a rigid plastic sheet having representative and random marble-like variegations as produced in accordance with the invention.

Referring to FIG. 1, there is shown extrusion apparatus including a twin-screw extruder section 10 equipped with an expansive circular die 11 which forms a tubular body from which rigid plastic sheet is obtained. The extruder section 10 has at one end a charging chute 12 through which a controlled amount of raw material received from a screw feeder or conveyor 13 is fed into the extruder barrel 14. A storage hopper 16 supplies raw material to the screw conveyor 14 which is driven by a suitable drive (not shown) at a rate determined by the amount of feed desired. In order to produce a marblized product it is necessary that two or more thermoplastic compositions of different color values be combined in proportions such that one material, representing the base color or composition, be present in an amount of at least about 90% of the total thermoplastic material, preferably between about 94% to 99.5%. For purposes of convenience, the composition representing the minor portion of the starting material or charge shall be referred to herein as the marblizing color or composition. One or more marblizing compositions may be employed. In practicing the invention the marblizing colors or compositions are compounded in that they have been previously fused together and include the usual constitutents of the plastic compound including, for example, the thermoplastic resin, lubricants, heat and light stabilizers, pigments, filler or the like. Such compounding of the marblizing colors is necessary if a marble-like variegation is to be produced from such color composition in the final product. Such compounds may have been previously fused, for example, by extrusion into rods or other shapes which are then diced or otherwise divided into small particles. Usually, it is desirable that all compositions making up the charge are previously compounded and divided into particles of suitable size. The relative size of the compounded particles introduced into the charging chute 12 is a variable influencing to some extent the particular marblized pattern to be obtained. Preferably, the particle size of the compounded materials is within the range of about 1 to 5 mm., more usually between about 1 to 3 mm. Particles of different size may of course be employed to obtain special and eye-pleasing marble-like patterns in the product. The different compounds making up the starting material fed to chute 12 are usually uniformly premixed before charging to the screw conveyor 13 but such mixing is not necessary as it is required only that the various compounds be fed to the chute 12 in the predetermined proportions, as by a number of separate metered feed streams. The starting materials charged from chute 12 to the extruder barrel 14 are advanced by the two co-rotating extruder screws and fused or fluxed within the restricted area of the extruded barrel 14 by heat supplied indirectly from electrical heating elements 17 which are inbedded in or surround the extruder barrel 14 throughout substantially its entire length. In order to produce a marblized rigid thermoplastic sheet by extrusion it has been found that the condition of the fluxed material produced in the extruder screw section and advanced to the die section 11 is particularly important and the entire operation in the extruder section including rate of feed of the starting materials and extruder screw design is directed to subjecting the starting materials to a controlled series of steps whereby there is produced a plastic melt or fluxed plug P in which the base and marblizing compounds are compressed together as a compatible flux with a substantial portion, at least about 50%, of the marblizing compound dispersed as separate and discrete entities in the base compound. Such a suitable fluxed plug has been found to be provided by combining and heating of the base and marblizing compounds as a loose mixture, continuing the heating and mixing of the combined compounds to partially flux or soften at least the base composition or compound and form a tacky agglomerated non-compressed mass as within a restricted zone having free space, and continuing the heating of said agglomerated mass and compressing to form a unitary composite mass in which the base and marblizing compound are fully fluxed together within a restricted area as a plug P in which the marblizing compound is dispersed throughout as separate and discrete small bodies. It has also been found that the steps to provide such a suitable plug may be carried out very conveniently under controlled conditions in a special extruder having two co-rotating specifically designed extruder screws 18 and 19, as illustrated in FIGS. 1 and 2. The extruder screws 18 and 19 are driven by a suitable constant speed motor 21 through shaft gears 22 and 23, respectively, which are connected for co-rotational movement by pinion 24. The individual extruder screws are helical members providing two essentially continuous inclined planes which on rotation subject the material within the extruder section to mechanical pushing or advancing forces and more or less to a mixing action. As shown particularly in FIG. 2, each of the extruder screws 18 and 19 have four longitudinal sections in which the helical thread have different pitch. An element in design of the extruder which may be employed in practice of the invention is the relative displacement of the screws between the sections A and D (shown FIG. 1), displacement being measured by the volume of material which can be handled between two successive threads on the screw shaft. Essentially, the displacement is a function of the distance between adjacent or successive threads and the root diameter of the connecting shaft or portion thereof. In the extruder apparatus employed in the invention the displacement ratio 5 to 1, usually between about 4:1 to 6:1. The relatively between sections A and D is relatively large or about high displacement ratio of the extruder screws 18 and 19 ensures that the charged materials will, at control feed rates, be advanced in the extruder barrel as a loose or non-compressed mixture throughout a substantial portion of the extruder barrel, even after fluxing, and then be compressed near the very end of the extruder screw section, as indicated by the flow pattern shown in phantom lines in FIG. 1. The rate of feed of the starting material is therefore controlled by the screw conveyor 13 so that the material entering the extruder through charging chute 12 will be advanced through a substantial length of the extruder without completely filling the extruder barrel 14 and without becoming highly compressed therein. In this manner it is possible to avoid substantial and undesirable homogeneous mixing which takes place in ordinary extruders due to the frictional and shearing forces exerted on the charge when the barrel is fully loaded and the charge compressed under high pressures sufficient to cause back flow of the fluxed charge in the extruder screw flight. Generally, it is desirable to set the rate of charge to the extruder barrel from hopper 12 such that final compression takes place just before the end of extruder barrel, desirably after the material has passed through at least 75% of the length of the extruder screws. Thus, rate of feed is controlled so that the charge entering the extruder barrel will form a loose mixture therein filling typically about 15-40% of the available space in section A. The mixture is advanced from section A into sections B and C of the extruder where it displaces a greater amount of the available space but not the entirety thereof as the difference in displacement ratio between the sections A, B and C is relatively small. During advancement in these sections the charge is continuously heated indirectly by the heaters 17 which surround the extruder barrel 14. Temperatures employed depend generally on the melt characteristics of the particular thermoplastic materials being processed and are set so that at least the base compound and desirably the entire charge is partially fluxed or heated to a temperature at which at least the outer surfaces of the charged particles become soft and tacky while advanced in sections B and C. Actual temperatures employed are usually about 5-25° C. above the fluxing temperature of the higher softening point material in the charge, preferably between about 5-15° C. above such temperature. Preferably, the temperature is slowly increased along the length of the extruder barrel 14 toward the die end. Generally, heating patterns may be constant or otherwise varied so long as temperature rise is not excessively rapid in the early sections. The partial fluxing of the material in sections B and C results more or less in agglomeration of the charge with the base compound surrounding and adhering to the individual marbilizing particles. Such agglomeration of the partially fluxed charge serves in part to protect or shield a great portion of the marblizing compound from shearing or frictional forces to which it may be subjecting by the mechanical forces present in the extruder barrel. Heating and advancement of the agglomerated mass is continued into section D where it begins to completely fill the available space in the extruder barrel. In section D the charge becomes more fully fluxed and is compressed together although such compression does not necessarily take place immediately upon entry into the section but more near the end thereof depending largely on the amount of charge and speed of rotation of the screws. In the type of extruder illustrated the speed of screw rotation is also a factor determining the extent of loading and point of compression of the charge within the extender barrel. A desired rate is within the range of typically 15-35 r.p.m. Postponement of the compaction of the fluxed charge until near the end of the extruder run will minimize high shear mixing action in the melt which tends to rapidly induce the formation of a homogeneous blend, it being particularly desirable to avoid such homogeneous blending to produce at the end of the extrusion barrel 14 a molten plug P in which the individual compounds are fused, as a compatible, unseparable mass but retain to a great extent their original identity as separate entities. Such compression of the fully fluxed charge causes the base and marblizing compound to be brought together as single integral inseparable yet compatible mass but not homogeneously admixed as the marblizing compound is dispersed therethrough as separate and discrete small masses representing various stages of deformation of the originally charged particles. Such discrete masses including flake and chip-like bodies have a maximum dimension ranging from about that of the originally fed particles (e.g., 1-5 mm.) up to about 30 mm. Once the mass is compressed it is rapidly discharged from the extruder section and beyond the mechanical action of the turning extruder screws which tend to cause undesirable homogenization of the marblizing colors because of the effect of frictional and shearing forces on the fully fluxed compressed mass. Rapid discharge of the compressed mass from the extruder screws and section D is effected by the two intermeshed and co-rotating screws which effect steady constant advancement of the fluxed mass without intensive mixing and/or backflow of material whose viscosity would become decreased by such intensive mixing or frictional heating as is encountered in ordinary extruders developing high compressive pressures and equipped with high shearing metering sections which would effect undesirable color dispersion or homogenization between the charged compounds. The action of the extruder screws on the fluxed material contained therebetween is therefore dynamic in that steady advancement is maintained and such material rapidly discharged from the extruder screw section D is formed into the plug P. Maximum residence time in the extruder screw section in the fully fluxed compressed state is not more than about 1 minute, more usually between 3 to 30 seconds. The possibility of backflow in the extruder section is also reduced because the pressure developed by the intermeshed twin extruder screws at the end of the screw section is typically of the order of less than 3,500 p.s.i., more usually between 1,200 to 2,500 p.s.i., or substantially less than that built up in ordinary thermoplastic extruders. The extruder section having four sections of varying pitch as shown in FIGS. 1 and 2 is merely illustrative and it will be evident that the desired displacement ratio in the extruder may be obtained with more or less sections of varying pitch. Generally, a suitable plug or plastic melt for the production of marblized sheet may be formed so long as the partially fluxed feed is agglomerated and further heated with the resulting mass, after full fluxing and compression, rapidly discharged from the zone of internal mechanical action or shearing forces. Thus, the fluxed material is subjected only briefly to any mixing or shearing forces in the compressed state and the plug P (if allowed to cool and examined at this point) contains the marblizing compounds in the form of separate and discrete partially deformed material resembling flake and chip-like bits which may be further acted upon during final extrusion through the die 11 to produce marblized variation in a sheet product. The deformation of the original particles of the marblizing compound produces a variety of flake and chip-like shapes or small fluxed masses and is caused largely by the compression of the previously only partially fluxed agglomerated mass and also to some extent by shearing forces to which the marblizing compound is subjected indirectly by the mechanical action of the turning screws on the fluxed mass during its brief residence in the compressed state in the extruder screw section. The various stages of deformation of the marblizing compound in the plug are responsible to a large extent for the many variegations resembling true marble in the final product.

The fluxed plug formed by the extruder screw section is continuously advanced by the pushing forces of the extruder screws through a restricted streamlined transition section 26. The transition section is heated indirectly by heaters 27 and is divided by a conventional breaker plate or strainer 28 to intercept extraneous and any unfluxed material. The heaters 27 are set to ensure that the advancing plug is maintained in the fluxed state. From the transition section the fluxed plug is advanced through an elbow section 29 which is also indirectly heated by heaters 31 to maintain the fluxed state. The elbow section 29 directs the fluxed plug downwardly through a pipe section 32 from which it advances and enters the circular die 11. The flow of the fluxed material in the circular die 11 is a particularly important factor in producing from the fluxed plug a rigid sheet material having the variegations of marble. A particularly preferred form of the die 11 is shown particularly in FIG. 2 to have an inverted funnel-like body fitted with a conical center piece 33 to form a continuous annular channel 34 of increasing diameter and constant or desirably slightly decreasing width. The die 11 may be readily constructed from a series of mating annular members including a flanged annular piece 36 joined to one end of pipe section 32 which has its opposite end secured to the elbow 29. A first funnel die section 37 is secured to the flanged annular member 36 by bolts (not shown). A web connecting section 38 is essentially a double ring section with one ring of smaller diameter connected to a larger outer ring by a plurality of thin webs 39 spaced radially between the rings. The web connecting section 38 serves to join the conical center piece 33 to the main outer funnel-like body of the die. The leading conical member 41 of the conical center piece 33 is joined to the web connecting section by a series of spaced annular tap bolts (not shown). The remainder of the die is made up of an outer annular member 42 and inner annular member 43 which are also assembled by a series of annularly spaced tap bolts (not shown). Annular heating elements 44 and 46 surround the die to maintain the material being extruded therefrom in the fluxed state. The advancing fluxed plug is intercepted longitudinally at a center portion thereof by the end point E of the main conical member 41. Thereafter, the fluxed material is diverted outwardly and flared as it passes into the annular channel 34 within the restricted passageway formed by the outer surfaces of the main conical member 41 and first funnel section 37. The expansive forces associated with the flaring out of the fluxed material coupled with the frictional and shearing forces on both surfaces of the advancing fluxed mass are main factors in producing variegations having the true marble-like appearance. The annular construction of the die also assures that the respective sides of the fluxed mass are subjected to equal forces to produce thereby variegations which are truly random in that no definite pattern of variegations is present in the sheet product as is also the case with natural marble. The fluxed material advancing in the annular channel 34 will pass around the webs 39 and rejoin or knit beyond the webs 39 to form a contiguous expanding profile as in the sections before the webs. Once the marble-like variegations are formed by the expansive and frictional forces of the flaring out of the advancing mass is directed or returned to a longitudinal direction in an annular orifice section 47 and extruded or emitted from the die as a continuously advancing tubular shape. While still at an elevated temperature the tubular shape is severed by an intercepting knife edge 48 and slowly turned out as a sheet 49.

The marblized products of the invention may be produced from a variety of thermoplastic resins including, by way of example, the vinyl chloride polymers and copolymers, polyethylene, polypropylene, cellulose acetate and derivatives thereof, acrylic resins and derivatives thereof, including copolymers and acrylonitrile and methacrylonitrile, and polystyrene. Generally, the more preferred thermoplastic materials to which the invention is especially applicable are the chlorine containing resins containing between about 40 to 70% by weight chlorine. The vinyl polymers and copolymers are usually employed with preference usually for the vinyl polymers containing 85 to 100 parts vinyl chloride and 0 to 15 parts of vinyl acetate or vinylidene chloride. Mixtures of the various thermoplastic materials may be employed in one or more of the compounded materials which are combined in the process subject to the limitations of compatibility. For example, each of the compounded compositions may contain polyvinyl chloride together with a minor portion between about 3 to 30% of an elastomeric chlorinated polyethylene to produce rigid products having high impact resistance. The more preferred vinyl polymers are those of intermediate molecular weight corresponding to intrinsic viscosities between about 0.5 to 1.0 in cyclohexanone at 25° C.

Two or more compositions of different color values are required to produce a sheet having marble-like variegations. At least one composition is predominantly present and serves as the base compound. The other composition or compositions are present in minor proportions and forms the marblized variegations in the sheet. In practice of the invention it is usually preferred to have some difference in melt and flow viscosity between the base and marblizing compounds combined to form the feed to the extruder. Having a difference in melt and flow viscosity does aid in avoiding excessive homogenization in the fluxed mass and contribute to the formation of variegations having a very pleasing appearance. However, it has been found that a great difference in flow viscosity between the combined materials is unnecessary and, in fact, it is possible to produce marble-like variegations in rigid sheet material by the method of the invention with little or no difference in flow viscosity between the combined materials. Usually, the fact that two compounds of different color values are combined will establish some difference in flow viscosity because of the different pigment materials employed. Thus, the flow viscosity of any compounded material will vary depending upon its make-up and will be affected by many components thereof including particularly the thermoplastic resin and its molecular weight, stabilizers, lubricants, other processing or extrusion aids, and a lesser extent even pigments, fillers and opacifiers. The difference in melt and flow vicosity, i.e., the difference in the rate at which the compound materials flow at a given elevated temperature, may be expressed as a percentage by which the viscosity of the less flowable compositon compound is greater than the viscosity of the more flowable composition at a given temperature. The difference in melt and flow viscosity is usually determined at the temperature of the fluxed mass or plug, i.e., the extrusion temperature. Especially good results are obtained in producing rigid sheet when the two combined compouds have a relatively minor difference in flow viscosity up to about 35%, preferably between about 3% to 25%. In make-up of the starting material either the base compound or the marblizing compound may have the higher melt and flow viscosity. Desirably, the marblizing compound has the higher melt viscosity. It has been found that very good results are obtained when such differences in flow viscosity are achieved primarily by varying the type and concentration of organic heat and/or light stabilizers or lubricants which may be incorporated in the compounds, particularly with the more stabilized compositions such as those containing the chlorine-containing resins and especially when the molecular weight of the resin in the base and marblizing composition is the same. Suitable stabilizing materials which may be employed in such compositions are well-known and include, by way of example, the organic and inorganic complexes and salts of metals such as barium, tin, cadmium, manganese, lead, zinc, etc. Examples of suitable inorganic salts include the sulfates, phosphites, phosphates, and carbonates such as monobasic lead phosphite, dibasic lead phosphite, monobasic lead sulfate, dibasic lead sulfate, tribasic lead sulfate and monobasic lead carbonate. The organic stabilizers well/known to function as lubricants are especially effective for use in obtaining a desired minor difference in melt and flow viscosity. The stearates and laurates are examples of organic metal salts which also act as lubricants and include, by way of specific examples, monobasic lead stearate, dibasic lead stearate, calcium stearate, manganese stearate, and zinc stearate. Examples of organic and organo-metal compounds having lubricant properties include hydrogenated castor oil and dibutyl tin dilaurate. Also very useful are the organic stabilizers which also serve as mild plasticizers. Examples of such materials include the liquid epoxy resins and epoxidized oils such as the liquid epichlorohydrin-Bisphenol A reaction products and octyl epoxy tallate. Suitable lubricants of many types are well-known and include, by way of example, paraffin wax, oxypolyethylene wax, stearic acid, mineral oil and epoxidized stearates. It has been found that particularly good results are obtained when two or more of such lubricants or organic stabilizers are employed in such quality and quantity as to be the primary factor in obtaining a difference in melt and flow viscosity between the individual compounds making up the starting material. For example, in the vinyl polymer Formulation 1, given below, lubricants and stabilizers which are organic and possess lubricant properties and/or mild plasticizing properties are distributed between the two compounded materials in proportion such that the marblizing composition has approximately a 10% greater flow viscosity than the base composition. Formulation 2 gives make-up of base and marblizing compositions which are both opaque with the marblizing compositon also having a slightly greater flow viscosity than the base composition. Generally, the total amount of stabilizing materials in any composition is between about 1–15 parts per 100 parts of resin, more usually between 2–10 parts. Materials which are well-known to be essentially plasticizers would also produce a difference in melt and flow viscosity. However, relatively large amounts of plasticizer produce products which are flexible rather than rigid and the use of a compounded system in which one material is highly plasticized also tends to produce a product in which the components if maintained separately enough to produce variegations, tend to be incompatible to the extent that the product is unsatisfactory. In obtaining the preferred minor difference in melt and flow viscosity plasticizers are not entirely ruled out. However, such materials are desirably employed in amounts which are less than the effective plasticizing level, preferably less than about 15 parts per 100 parts of the thermoplastic resin. Desirably, the use of plasticizing materials is limited to amounts not in excess of about 5 parts per 100 parts of thermoplastic resin. Given below are representative formulations from which rigid marblized sheet having either translucent or opaque bases may be produced.

FORMULATION 1.—TRANSLUCENT BASE-OPAQUE MARBLE

| Component | Translucent Base Compound, Parts by Weight of Component | Opaque Marblizing Compound, Parts by Weight of Component |
| --- | --- | --- |
| Thermoplastic Resin: Polyvinyl Chloride | 100 | 100 |
| Stabilizers: | | |
| Inorganic Salts | | 4.00 |
| Organic Salts which are also lubricants | 2.25 | 2.50 |
| Organic Stabilizers which are also mild plasticizers | 2.00 | |
| Lubricant: Wax (paraffin) | | 0.25 |
| Opacifier: Titanium Dioxide | | 4.00 |
| Pigment: Phthalocyanine (Green or Blue) | 0.003 | |
| Filler: Calcium Carbonate plus Calcium Salts or Fatty Acids | | 4.00 |

FORMULATION 2.—OPAQUE BASE-OPAQUE MARBLE

| Component | Opaque Base Compound, Parts by Weight of Component | Opaque Marblizing Compound, Parts by Weight of Component |
| --- | --- | --- |
| Thermoplastic Resin: Polyvinyl Chloride | 100 | 100 |
| Stabilizers: | | |
| Inorganic Salts | 2.00 | 4.00 |
| Organic Salts which are also lubricants | 3.25 | 2.50 |
| Organic stabilizers which are also mild plasticizers | 2.00 | |
| Lubricants: Wax (paraffin) | | 0.25 |
| Opacifier: Titanium Dioxide | 4.00 | 4.00 |
| Pigment: Phthalocyanine Blue | 0.04 | |
| Filler: Calcium Carbonate plus Calcium Salts of Fatty Acids | 4.00 | 4.00 |

The following example in which parts and percentages are by weight demonstrates the practice and advantages of the present invention.

EXAMPLE 1

Figure 4:
FIG. 4 shows the opposite side of the sheet shown in FIG. 3.

The apparatus employed was similar to that above described and illustrated in FIGS. 1 and 2 of the accompanying drawings. The extruder had twin co-rotating intermeshing screws having length of 73 inches. Each screw had four corresponding intermeshed sections of different pitch, land and outside and root diameter. Section A near the feed end of the extruder barrel had a pitch of 2.95 inches, a 0.47 inch land, a 4.9 inch outside diameter and 2.35 inch root diameter. Section B had a pitch of 1.85 inches, a 0.35 inch land, a 4.90 inch outside diameter and 2.36 inch root diameter. Section C had a pitch of 1.45 inches, a 0.236 inch land, a 4.7 inch outside diameter and 2.55 inch root diameter. Section C at the die end of the extruder barrel had a pitch of 1.1 inches, a 0.21 inch land, a 4.7 outside diameter. Distance between the longitudinal centerlines of the two intermeshed screws was 3.64 inches. Clearance between the screws and the interior walls of the extruder barrel was 0.010 inch. Positioned about 7.5 inches from the end of the extruder screws was a breaker plate or strainer having streamlined holes of 3/8 inch diameter. Following the breaker plate there was a chamber tapered to a 4 inch diameter and having a length of about 4 inches. This chamber led to an elbow having 4 inch inside diameter and length on each side of 6 inches. The circular die was positioned vertically with one end secured by a 4 inch inside diameter pipe section to the angle bend. Internal diameter of the circular die at the beginning of a cone section was 5 inches. Length of the die from the cone tip to the extruded orifice was 24 inches. The annular extrusion orifice defined a 0.050 inch wide ring having an average diameter of 19 inches. The conical center piece had an angle at its apex of about 100° and was secured to the main section of the die by 8 aerodynamically shaped webs having a maximum thickness of about 3/4 inch and length of about 4 inches. The annular passageway formed by the cone and main die section had a width of about 2 inches at its beginning, about 1½ inches at the location of the webs and about ½ inch at a location past the webs at which the channel ceased to diverge. The extruder barrel was equipped with electrical heaters throughout its length and was preheated throughout to a temperature profile of 150° C. at the feed end increasing uniformly to 180° C. at the discharge end of the extruder screws section. There was fed to the extruder a mixture of previously fused compounds which had been extruded and diced into rods having 1/8 inch diameter and 1/8 inch length. The two components of the feed mixture were the same as Formulation 1, above, with the translucent and opaque materials uniformly admixed in a ratio by weight of 99 to 1. The polyvinyl chloride employed in both the base and marblizing compounds had a molecular weight corresponding to an intrinsic viscosity of 0.77 in cyclohexanone at 25° C. Rate of feed to the extruder was 250 lbs./hr. such that only about 25% of the available space in the extruder barrel at the point of feed was displaced. The extruder screws were rotated at 20 r.p.m. such that approximate residence time in the extruder before discharge from the end of the extruder screws was about 3½ minutes. The rate of feed to the extruder was such that the loose mixture was maintained within the extruder barrel over a course of about 60% of the length of the extruder screws. Heating of the charged mixture was such that the complete charge fused after traveling over the course of about 80% of the length of the extruder screws. The circular die was heated by means of an electrical heater to maintain a temperature of about 170° C. and there was extruded therefrom continuously a tubular shape having a diameter of 19 inches. After extrusion the tubular shape was severed longitudinally and flatten into a continuous sheet by means of a pair of press rollers. The sheet formed had a width of about 59 inches, thickness of 50–55 mils and a blue translucent background with white and blue white marble-like variegations on the surfaces thereof, substantially as shown in FIGS. 3 and 4. The surface shown in FIG. 3 was that obtained from the inside surface of the tubular shape.

The sheet produced by the method of the invention may have substantial width up to 100 inches or more, usually between 40–75 inches, and thickness between about 10 to 300 mils or more. Thus, the circular die orifice may have a diameter ranging up to 30 inches or more. The sheets produced by the invention are characteristically rigid, smooth surface sheets in which all compounds are compatibly and integrally fluxed together. These rigid sheet products are also characterized by having two sides with random variegations of different marble-like patterning and pronouncement or accentuation of such patterning. Such differences are caused by the greater length of surface contact to which the fluxed material is subjected during passage through the apparatus. Thus, the outer surface of the fluxed plug is exposed to greater contact and frictional and shearing forces than the surface formed when the plug is intercepted by the conical center piece 33. These additional frictional and shearing forces exerted on the outer surface of the fully fluxed material at the end of the extruder screw section and during passage through the transitional section 26, elbow 29 and pipe section 32 have been found to be sufficient to cause considerable variation in the pronouncement or accentuation of the variegation in the final product. As the friction or shearing forces to which the material is subjected tends to cause undesirable homogenization of the compounds the variegations produced from the outer surface of the advancing plug may have less than fully adequate patterning and pronouncement to provide a truly eye-pleasing surface, particularly when only very minor amounts of the order of about ½ to 2% of marblizing compound are employed. For example, it has been found in certain situations that examination of the plug just after formation in the transition section had large veins resembling marble and caused by action on the surface of the material in the fully fluxed state at the end of the extruder screw section. However, after passage through the transition section, elbow and circular die these marble-like veins had been so affected by surface shearing forces that the resulting surface had variegations which were less in number and pronouncement than the side of the sheet produced by contact only with the surface of the conical center piece 33. Thus, the employment of the conical center piece also becomes important in many forms of practice of the invention to produce sheet products having at least one side on which there are marble-like variegations of definite and eye-pleasing pronouncement. Particularly excellent random marble-like variegations are obtained on the side of the sheet produced from the conical center piece surface when employing starting mixtures having base and marblizing compounds of relatively little difference in melt and flow viscosity and based on similar thermoplastic polymers of intermediate molecular weight, fo rexample, a vinyl chloride polymer having molecular weight corresponding to an intrinsic viscosity between about 0.5 to 1.0 in cyclohexanone at 25° C. Such a starting mixture is employed in Example 1 and the pronouncement of marble-like variegations produced by the surfaces of the conical center piece 33 are shown in FIG. 3. The opposite side of the sheet produced along the outer funnel side of the die from the outer surface of the plug is shown in FIG. 4. A comparison of FIGS. 3 and 4 clearly shows different amounts of patterning and pronouncement although both sides of the sheet have random variegations.

The method of the invention may be employed to produce rigid sheet material in which one or more of the compounds is a translucent material or in which all the compounds are opaque. The production of a sheet having a translucent base compound not only permits the manufacture of a greater variety of products but also products which have varied amounts of light transmitting properties. Thus, rigid sheets having a translucent base material and varied amounts of an opaque marblizing compound may be employed in building applications, both interior and exterior, where it is desired to control or regulate the amount of light transmitted through the sheet or panel or other forms which may be produced by vacuum forming, corregation, or other subsequent processing of the rigid sheets produced by the invention. Such sheets have considerable utilization either alone or in combination with solid colored panels to provide pleasing and attractive interior and/or exterior dividers, table and counter tops formed accessories such as molded trims, and the like.

The present invention is not intended to be limited to production of sheet products only from starting materials having sharply contrasting color values or a base composition comprising 90% or better of the charge. Thus, a plurality of compounded materials of different shades of the same or similar color may be employed in widely varying proportions to produce rigid sheet product having a wood grain or similar pleasing appearance.

Although certain preferred embodiments of the invention have been disclosed for purpose of illustration, it will be evident that various changes and modifications may be made therein without departing from the scope and spirit of the invention.

I claim:

1. A process for producing variegated rigid thermoplastic sheet products comprising combining and heating a major and at least one minor thermoplastic synthetic resin component of different color values in proportion such that the major resin component comprises at least 90% of the resin combination, at least said minor component being previously compounded and in particulate form, continuing the heating of said combined thermoplastic resins to partially flux at least the major resin component and form a tacky agglomerated non-homogeneous mass, continuing the heating and compressing said mass until the major and minor components are fully fluxed with at least about 50% of the minor component dispersed throughout the major component in the form of separate and discrete entities, advancing and expansively flaring said fluxed mass between closely opposing annular surfaces defining a narrow cone-like passageway while maintaining the minor component as separate and discrete entities, and thereafter continuously directing the leading peripheral edge of said flared mass to form a continuously advancing tubular shape having surface variegations.

2. A process in accordance with claim 1 wherein said major and said minor resin components differ in melt viscosity and wherein said major component comprises from about 94 to about 99.5% of said resin mixture.

3. A process in accordance with claim 2 wherein said difference in melt viscosity between said components is achieved by variation in the amount and chemical structure of materials selected from the group consisting of organic stabilizers and lubricants incorporated in said components.

4. A process in accordance with claim 1 wherein said heating of said combination of thermoplastic resin components is effectuated within an elongated restricted zone having free space and wherein said combination is advanced within said zone by rotating mechanical action.

5. A process in accordance with claim 1 wherein the separate and discrete entities of the minor component in the fully fluxed mass represent various stages of deformation of the original particles of said minor component and said original particles include flake-like and chip-like bodies.

6. A process in accordance with claim 1 wherein both the major and minor components comprise a vinyl chloride polymer resin and the major component is previously compounded and in particulate form, said minor component having a higher melt viscosity than said major component.

7. A process in accordance with claim 1 wherein said major component is a translucent thermoplastic resin and said minor component is an opaque thermoplastic resin composition, both said major and said minor components being in the form of particles having a size ranging from about 1 to about 5 millimeters, and wherein both said major and said minor components comprise a vinyl chloride polymer of substantially the same molecular weight, and wherein said minor component has a melt viscosity ranging from about 3% to about 25% higher than that of said major component at the flux temperature.

References Cited

UNITED STATES PATENTS

| 3,015,640 | 2/1962 | Weaver et al. | 264—76 |
| 3,060,502 | 10/1962 | Snyder | 264—76 |
| 3,145,241 | 8/1964 | Powell | 264—76 |
| 3,038,828 | 6/1962 | Yakubik | 156—306 |

FOREIGN PATENTS

| 557,582 | 5/1958 | Canada. |

JAMES A. SEIDLECK, *Primary Examiner.*

DONALD J. ARNOLD, *Examiner.*

T. MORRIS, *Assistant Examiner.*